United States Patent [19]

Swiger

[11] 3,875,114

[45] Apr. 1, 1975

[54] AMIDOMETHYLENE MODIFIED AROMATIC CARBOCYCLIC POLYMERS AND METHODS FOR MAKING THE SAME

[75] Inventor: Roger T. Swiger, Schenectady, N.Y.

[73] Assignee: General Electric Company, Schenectady, N.Y.

[22] Filed: June 18, 1973

[21] Appl. No.: 370,816

[52] U.S. Cl. ........ 260/47 XA, 204/159.14, 260/2 R, 260/46.5 Y, 260/47 ET, 260/55, 260/75 N, 260/78 TF, 260/78 SC, 260/79, 260/93.5 A, 260/94.1, 260/824 R, 260/860, 260/880 R
[51] Int. Cl. ..................... C08f 7/02, C08g 17/13
[58] Field of Search ....... 260/93.5 A, 47 XA, 47 ET

[56] References Cited
UNITED STATES PATENTS
3,024,282  3/1962  Parris............................ 260/562 R
3,137,707  6/1964  Schaeffer........................ 260/346.4

FOREIGN PATENTS OR APPLICATIONS
661,257  7/1965  Belgium

OTHER PUBLICATIONS
Chemical Abstracts, Vol. 73, 1970, 56981V, (Matsuschita et al.)
Flory, Principles of Polymer Chemistry, 1953, pp. 75–78; 102–103.

Primary Examiner—Harold D. Anderson
Attorney, Agent, or Firm—Joseph T. Cohen; Jerome C. Squillaro

[57] ABSTRACT

Amidomethylene substituted aromatic carbocyclic polymers containing a chemically combined phenylene radical are obtained by interreacting in the presence of an effective amount of a suitable acidic catalyst, a polymer containing in chemically combined phenylene radical and an amidoalkylating agent having the general formula

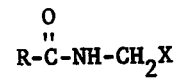

where R is either methyl or $CH_2=CH-$ and X is halogen, the hydroxyl radical, or an ester radical. Polymers obtained thereby have improved oil resistance and where the amidoalkylating compound contains the $CH_2=CH-$ grouping, such modified polymers can be cured by ultraviolet light, by heat or in the presence of heat and a free radical producing compound to yield crosslinked products.

4 Claims, No Drawings

AMIDOMETHYLENE MODIFIED AROMATIC CARBOCYCLIC POLYMERS AND METHODS FOR MAKING THE SAME

This invention is concerned with amidomethylene substituted aromatic carbocyclic polymers (hereinafter referred to as "aromatic polymer") containing a chemically combined phenylene radical to which in turn is attached a group having the formula I 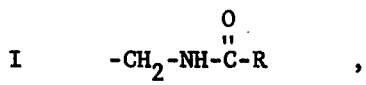

where R is either methyl or $CH_2=CH-$. The invention also includes a process for making such amidomethylene substituted aromatic carbocyclic polymers by effecting reaction between the aforesaid polymer and an amidoalkylating agent having the formula

II $R-C-NH-CH_2X$ where R has the meaning given above and X is halogen (e.g., chlorine, bromine, etc.), the hydroxyl radical or an ester group, such as

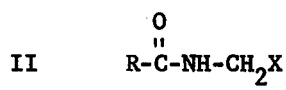

etc.

The polymers obtained as a result of the amidoalkylating step have been found to have improved oil resistance. In addition, those polymers which have the amidomethylene substitution derived from a methylolamidoalkylating agent where R is the $CH_2=CH-$ grouping, have the additional benefit of being cured rapidly, to the substantially infusible and insoluble state at normal temperatures, by means of ultraviolet light. The use of heat and the usual free radical-producing compounds in the cure of such acrylamidomethylene-substituted polymers, accelerates the rate of cure of the compositions.

My process for making these amidomethylene modified polymers is open to a considerable degree of flexibility as to how this modification is accomplished. Advantageously, the bulk polymer is dissolved in a suitable solvent with the amidoalkylating agent, and then effecting reaction using a suitable acidic catalyst in the mixture. In this way one can attach to the phenylene radicals of the aromatic carbocyclic polymers, amidomethylene groups of the formula

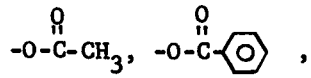

where R has the meanings above. These groups impart to the final product improved surface characteristics such as the above-mentioned resistance to oil, and also, in the case of acrylamido substitution, the ability to treat the article expeditiously with ultraviolet light to effect curing and further case hardening of the surface of any article molded therefrom.

Among the amidoalkylating agents which can be used are, for instance, N-methylolacetamide (which can be prepared by the reaction of acetamide with formaldehyde as shown, for example, in British Pat. No. 291,712), N-methylolacrylamide (which can be prepared by reacting acrylamide and formaldehyde in the presence of potassium hydroxide), compounds of the formulae

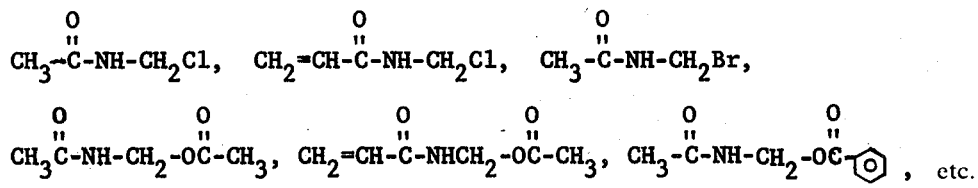, etc.

The particular aromatic carbocyclic polymer containing a chemically combined phenylene radical (herein referred to as aromatic polymer) can be any one of the many polymers which have the phenylene radical preferably, though not essentially, in the backbone of the polymer. It is also required that the phenylene radical of the aromatic polymer have at least one nuclearly bonded hydrogen for purposes of attachment when reacting with the amidoalkylating agent. The particular aromatic polymer which is employed is not critical and there are numerous such polymers which can be employed. Included among such polymers may be mentioned, for instance, polystyrene, polyphenylene oxides such as those shown in U.S. Pat. No. 3,306,875, epoxy resins, polycarbonate resins such as shown in U.S. Pat. No. 3,028,365, organopolysiloxane resins such as shown in U.S. Pat. Nos. 2,258,219, 2,258,221, and 2,258,222; phenolaldehyde resins, polyimide resins such as shown in U.S. Pat. Nos. 3,179,633–634, polyethers such as shown in U.S. Pat. No. 3,332,909, polybutylene terephthalate resins, polyester resins such as shown in U.S. Pat. Nos. 3,036,990 and 3,160,602; etc. Other aromatic carbocyclic polymers which may be employed include polyamideimides, polysulfones, polyxylylene, polyarylacetylenes, polyphenylenes, polysulfides, poly(alphamethylstyrene), poly(chlorostyrene), poly(dichlorostyrene), styrene copolymers and terpolymers with butadiene, acrylonitrile, methylmethacrylate, vinylidenechloride, maleic anhydride, vinylchloride, vinylacetate, alphamethylstyrene, etc. For example, there can be employed in the practice of the invention polystyrene-polybutadiene graft copolymers, polydimethylsiloxanepolyphenylenecarbonate block copolymers, etc.

The method whereby the aromatic polymer can be treated with the amidoalkylating agent is relatively simple. All that is necessary, for instance, is to dissolve the aromatic polymer in a suitable solvent with the amidoalkylating agent and thereafter advantageously heating the mixture in the presence of the acidic catalyst. Among the solvents which can be employed are those which are solvents for the aromatic polymer and advantageously for the amidoalkylating agent. Among such solvents may be mentioned, for instance, chloroform, methylene chloride, tetrachloroethane, chlorobenzene, carbon disulfide, nitromethane, nitrobenzene, and other solvents with electronegative substituents or mixtures of such solvents.

The acidic agent used can be any one of those which is normally designated a Friedel-Crafts catalyst. Among such catalysts may be mentioned ferric chloride, hydrogen chloride, aluminum chloride, boron trifluoride, boron trifluoride-etherate complex, boron trichloride-methyl alcohol complex, toluene sulfonic acid, zinc chloride, etc. When the catalyst is in the form of a gas, such as boron trifluoride, the latter can be easily passed through the solution of the aromatic polymer and the amidoalkylating agent.

The acidic catalyst (advantageously a Friedel-Crafts catalyst) can be employed in an amount which is effective to establish the modification in and attachment of the amidomethylene group to the phenylene radical of the aromatic polymer. Generally, one can employ amounts ranging from about 0.001 to about 10%, by weight, of the acidic catalyst based on the weight of the aromatic polymer. Obviously, since the amount is not critical, larger or smaller amounts of the acidic catalyst may be employed depending on whether it is a solid, liquid or gas, depending on the particular aromatic polymer employed, the particular amidoalkylating agent used, the reaction temperature, etc.

The temperature at which the reaction proceeds between the amidoalkylating agent and the aromatic polymer can be varied widely. Generally, depending on the aromatic polymer used, the particular acidic catalyst, the concentration of the catalyst, etc., temperatures may range from around −10° to about 125°C. Preferably temperatures from about 5° to 80°C are adequate. It will, of course, be understood that where the acrylamidomethylating agent is used, temperatures should be kept low in order to avoid premature curing of the reactant or the aromatic polymer modified with such reactant. Atmospheric pressures are usually adequate, although superatmospheric or even subatmospheric pressures are not precluded.

Reaction times will vary depending upon such factors as the temperature employed, degree of agitation, the type of amidoalkylating compound employed, the nature of the aromatic polymer as well as the degree of amidoalkylation desired in the final product. Periods ranging from about 1 hour or less to as many as 48 hours or more will, therefore, not be unusual and under most circumstances, effective results can be achieved for times ranging from about 1 to 6 hours to provide for at least about 5 mol percent of amidoalkylene substitution, based on the total mols of chemically combined aromatic organic units in the polymer.

During the amidoalkylation of the aromatic organic polymer, substantially anhydrous conditions are advantageously maintained in order to provide optimum results. Recovery of the final amidoalkylated aromatic polymer can be achieved by the use of a low molecular weight aliphatic alcohol into which the reaction mixture can be poured to provide separation of the final product. The amidoalkyl substituted aromatic polymer can then be recovered by filtration or other means commonly used in the art followed by standard drying techniques.

As typical examples where attachment of the amidoalkylene radical occurs on a phenylene radical of an aromatic carbocyclic polymer, attention is directed to generic formulas for such polymers as polystyrene and polycarbonate resins made from bisphenol-A and a phosgenating agent such as phosgene or diphenylcarbonate. For instance, if one is modifying the properties of a polystyrene resin, the modified polymer will have the general formula

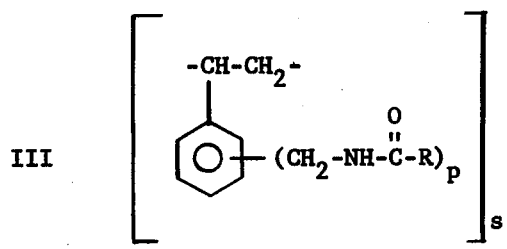

where R has the meaning above and $p$ is a number, ranging from about 0.01 to as high as 3 or 4, which represents the average number of amidoalkylene groups substituted on each phenylene radical.

Where the amidoalkylene substitution is on a polycarbonate resin, the polymer would have the general formula as follows:

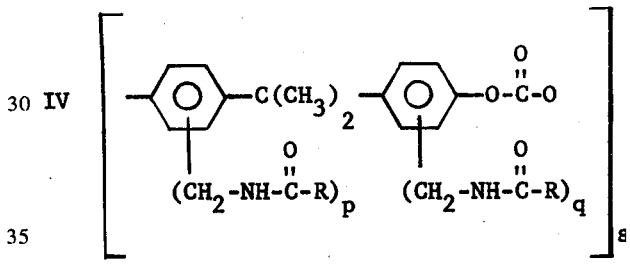

where R has the meaning above, and $p$ and $q$ are numbers which represent the average number of amido alkylene groups substituted on each phenylene radical, and can have values ranging from about 0.01 to as high as 3 or 4. In both Formulas III and IV, the recurring unit s can be a whole number greater than 1, for instance, 10 to 10,000 or more.

It should be recognized that in any polymer chain each phenylene nucleus may not have an amido alkylene radical attached thereto. For instance, where the value of $p$ is below 1, it may be that there is one amido alkylene radical attached to every 5 to 10 phenylene radicals in the polystyrene chain. By the same token, there may also be one amido alkylene radical present in every 5 to 10 or more diphenylene isopropylidene groups. This could mean that only one phenylene radical in a diphenylene isopropylidene might have an amido alkylene radical attached thereto.

The amido-alkylene-substituted aromatic organic polymer provided by the present invention can be employed in a variety of applications depending upon such factors as the type of aromatic organic polymer, the degree of amido-alkylene-substitution in the polymer, and whether the amido-alkylene radicals are aliphatically unsaturated, or free of aliphatic unsaturation. For example, in instances where the aromatic organic polymer has chemically-combined aliphatically unsaturated acrylamido-alkylene radicals, these materials can be employed in a variety of applications such as molding compounds, varnishes, adhesives, laminating compounds, solvent-resistant coatings, dielectrics, insulating coatings, and several other applications normally requiring free radical and high energy electron curable materials convertible from the thermoplastic to thermoset state. In instances where the aromatic organic polymers are substituted with acetamido-alkylene radicals free of aliphatic unsaturation, such aromatic organic polymers can provide for solvent-resistant coating compounds, molding resins, high temperature and oxidatively stable fibers and films, etc.

The amido-alkylene-substituted aromatic organic polymers of the present invention can be blended with various aliphatically unsaturated organic materials, such as aliphatically unsaturated organic monomers and certain aliphatically unsaturated organic polymers as well as organic polymers free of aliphatic unsaturation. Blends of the amido-alkylene-substituted aromatic organic polymers and the aforementioned organic monomers or polymers can be made over a wide proportion by weight. Those skilled in the art will know, for example, that as the proportion of the acrylamido-alkylene radicals in the aromatic organic polymer increases with respect to either the organic monomer or polymer in the blend, particularly where the mol percent substitution acrylamido-alkylene radical on the aromatic organic polymer exceeds 25 mol percent or more, the degree of crosslinking of the blend would be sufficiently high to make the resulting cured product an ideal solvent-resistant coating or insulating material.

Included among the aliphatically unsaturated monomers that can be employed in combination with the acrylamido-alkylene-substituted aromatic organic polymers of the present invention are, for example, styrene, bismaleimide, N-phenylmaleimide, vinylchloride, isobutylene, butadiene, isoprene, vinyl esters of organic carboxylic acids such as vinylacetate; acrylonitrile; esters of acrylic and methacrylic acids, etc.; divinylbenzene, triallylcyanurate, triallyltrimellitate, vinyl siloxanes, etc. Among the organic polymers that can be employed in combination with the amido-alkylene-substituted aromatic organic polymers of the present invention are, for example, polyvinylchloride, polyethylene, polypropylene, polyarylsulfones, polystyrene, polyurethane, organopolysiloxanes, polyesters, polyphenyleneoxides, epoxies, etc.

Cure of the acrylamido-alkylene-substituted aromatic organic polymer, or blend thereof with any of the aforementioned organic monomers or polymers, or combinations thereof, can be effected thermally, or by the use of conventional free radical initiators. Temperatures of from 50° to 300°C can be employed while 100° to 200°C has sometimes been found to be more desirable. Acceleration of the cure of the acrylamido-alkylene-substituted aromatic organic polymer, or blend thereof, can be achieved with organic peroxides, such as dicumylperoxide, benzoylperoxide, tertiary butylperbenzoate, etc.

In making molded products, there can be employed, by weight, fillers in proportions of from 0 to 200 parts of filler per 100 parts of the amido-alkylene-substituted aromatic organic polymer. Included in the fillers which can be employed are, for example, ground quartz, silica, carbon black, glass fibers, carbon fiber, asbestos, etc. In addition, other ingredients such as solvents at from 0.5 to 3 parts, by weight, of the solvent per part of the polymer also can be employed, such as, N-methyl pyrrolidone, dimethylacetamide, toluene, methylene chloride, etc.

In order that those skilled in the art may better understand how to practice the invention, the following examples are given by way of illustration and not by way of limitation. All reaction mixtures involving amido-alkylation were stirred during the introduction of the Friedel-Crafts catalyst.

The polyphenylene oxide polymer employed in the following examples was a poly(2,6-dimethylphenylene) oxide which can be prepared in accordance with U.S. Pat. No. 3,306,875, issued Feb. 28, 1967.

The polycarbonate resin employed in the following examples is sold by General Electric Company under the trademark Lexan and can be made by treatment of bisphenol-A with either diphenyl carbonate or phosgene, as shown in U.S. Pat. No. 3,028,365.

The polystyrene employed in these examples was sold by Monsanto Chemical Company and is designated as HH-101 polystyrene resin.

The N-methylolacetamide used herein was prepared by reacting 236.3 grams (4.0 mols) acetamide, 126.1 grams (4.2 mols) paraformaldehyde, about 2 grams potassium hydroxide and 400 ml. ethanol. The solution thus formed was stirred for about two hours and then the volatile materials were removed by distillation. The remaining liquid solidified into a crystalline mass which was recrystallized from a mixture of 2000 ml. ethyl acetate and 150 ml. acetone. This yielded about 215 grams of N-methylolacetamide, melting point 42°–45°C.

EXAMPLE 1

To a reaction vessel fitted with stirrer, condenser, and thermometer were placed 4.80 grams (0.04 mol) polyphenylene oxide resin, 1.01 grams (0.01 mol) M-methylolacrylamide, 100 ml. chloroform, and 14 ml. nitromethane. The resulting solution was cooled to 5°C with an ice bath and thereafter BF$_3$ gas was passed through the solution for about 1 hour until it was saturated. The solution was mixed with methanol to precipitate the polymer which was collected by filtration and dried to yield 5.39 grams of a polymer containing 0.22 acrylamidemethyl group

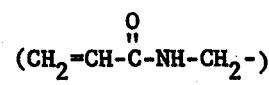

per phenylene radical. This was established by the nitrogen analysis which showed that about 2.2% nitrogen was present in the polymer as compared to the 2.49% theoretical nitrogen which would be present as a result of using 25 mol percent of the N-methylolacrylamide. A thin film of this polymer could be crosslinked within 5 seconds when irradiated with UV light. Prior to treatment with the UV light, the material was insoluble in toluene as contrasted to the unamidized polyphenylene oxide which is soluble in toluene. This established clearly the improvement obtained by modifying the polyphenylene oxide with the acrylamido methylene groups.

EXAMPLE 2

Employing the same conditions as in Example 1, but this time using a 12.5 mol percent level of the N-methylolacrylamide, 4.80 (0.04 mol) grams of the polyphenylene oxide resin was reacted with 0.51 gram (0.005 mol) N-methylolacrylamide to give 3.38 grams of modified polymer which upon analysis showed that it contained about 1.12% nitrogen, indicating the presence of about 0.10 acrylamido methylene group per phenylene radical. Again, a thin film of this product could be crosslinked within 5 seconds when irradiated with UV light.

EXAMPLE 3

Employing the same conditions as in Example 1, 5.08 grams (0.02 mol) polycarbonate resin was reacted with 0.51 gram (0.05 mol) N-methylolacrylamide for about two hours to give a modified polymer weighing 5.14 grams. Analysis showed that the product contained about 0.41% nitrogen indicating that there was present 0.08 acrylamido methylene groups (attached to a phenylene radical) per biphenyl isopropylidene group

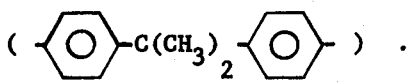

EXAMPLE 4

Employing the same conditions as in Example 1, 50.8 grams (0.2 mol) polycarbonate resin, was then reacted with 4.04 grams (0.04 mol) N-methylolacrylamide in 900 ml. chloroform and 100 ml. nitromethane. The solution was saturated with $BF_3$ over a period of 120 minutes to give 51.38 grams of a polymer which upon nitrogen analysis showed it to contain about 0.48% nitrogen indicating that there was present 0.09 acrylamido methylene radicals per biphenylene isopropylidene unit.

EXAMPLE 5

Employing the same conditions as in Example 1, 4.17 grams (0.04 mol) polystyrene was reacted with 1.01 grams (0.01 mol) N-methylolacrylamide and 100 ml. chloroform, and 14 ml. nitromethane. The solution was saturated with $BF_3$ gas for a period of about 3 hours to yield a polymer weighing about 2.61 grams. The nitrogen analysis showed the polymer to contain about 1.5% nitrogen, indicating that there was present 0.12 acrylamido methylene group attached to a phenylene group) per styrene mer unit.

EXAMPLE 6

Employing the same conditions as in Example 1, 4.80 grams (0.04 mol) polyphenylene oxide resin was reacted with 0.89 gram (0.01 mol) N-methylolacetamide in 90 ml. chloroform and 10 ml. nitromethane. $BF_3$ gas was passed through the solution of the reactants for a period of about 20 minutes until saturation of the solution was obtained. This resulted in a polymer weighing 4.43 grams which analysis showed it contained about 1.9% nitrogen indicating that there was present about 0.18 acetamido methylene

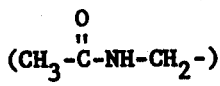

group per phenylene radical.

EXAMPLE 7

Example 6 was repeated but this time employing larger amounts of reactants. More particularly, employing the conditions described in Example 1, 12.02 grams (0.01 mol) polyphenylene oxide resin was reacted with 2.23 grams (0.025 mol) N-methylolacetamide in 130 ml. chloroform and 20 ml. nitromethane. $BF_3$ gas was passed through the solution of the reactants for a period of time until the solution was saturated with $BF_3$ gas to give a polymer weighing 12.36 grams. Analysis showed that it contained about 1.22% nitrogen indicating that there was present 0.11 acetamido methylene group per phenylene radical in the polymer. This polymer was insoluble in toluene as compared with the unamidized polyphenylene oxide which was soluble in toluene.

EXAMPLE 8

Employing the same conditions as in Example 1, 5.08 grams (0.02 mol) polycarbonate resin was reacted with 0.89 gram (0.01 mol) N-methylolacetamide in 90 ml. chloroform and 10 ml. nitromethane. $BF_3$ gas was passed through the solution for about 6 hours until it was saturated. This yielded a polymer weighing about 5.17 grams showing a nitrogen content of about 1.63% indicating about 0.32 acetamido methylene group (attached to a phenylene radical) per diphenylene isopropylidene group. This modified polycarbonate resin was insoluble in chloroform and benzene whereas the unamidized polycarbonate resin was soluble in both these solvents.

EXAMPLE 9

Following the conditions of Example 1, a solution was prepared of 5.08 grams (0.02 mol) of a polycarbonate resin, 1.78 grams (0.02 mol) N-methylolacetamide, 90 ml. chloroform and 10 ml. nitromethane. Thereafter, $BF_3$ gas was passed through the solution for a period of about 5 hours until the solution was saturated with $BF_3$. This yielded a polymer weighing 4.46 grams. Analysis of the polymer showed that it contained about 2.9% nitrogen indicating that there was present about 0.62 acetamido methylene group per biphenylene isopropylidene group. This modified polymer was insoluble in chloroform and benzene as contrasted to the unmodified polycarbonate resin which was soluble in both these solvents.

EXAMPLE 10

Employing the equipment described in Example 1, 10.42 grams (0.1 mol) polystyrene and 2.33 grams (0.025 mol) N-methylolacetamide were dissolved in 320 ml. chloroform and 80 ml. nitromethane. The resulting solution was cooled to 7°C in an ice-water bath and thereafter $BF_3$ gas was added until a yellow color appeared. The $BF_3$ addition was stopped and the ice-water bath removed. After waiting an additional 60 minutes, while the solution warmed up to room temperature, 20 ml. methanol was added and the clear almost colorless solution was slowly added to 3000 ml. methanol. The polymer which precipitated was collected and dried at 80°C under vacuum for 16 hours to give 10.03 grams of a polymer showing a nitrogen content of about 1.72%. This indicated that there was present an average of 0.14 acetamido methylene group per phenylene radical in the polystyrene. This polymer had a glass transition temperature ($T_g$) of 121°C. When a sample was compression molded from this modified polymer, it was found to have a critical strain in an oil composed by weight of 50 parts cottonseed oil and 50 parts maleic acid of 0.36% when measured by the procedure described in an article by R. L. Bergen in the Society of Plastics Engineering Journal, 18,667 (1962).

EXAMPLE 11

Employing the conditions described in Example 10, 10.42 grams (0.1 mol) polystyrene and 1.11 grams (0.0125 mol) N-methylolacetamide were dissolved in 80 ml. chloroform and 20 ml. nitromethane. $BF_3$ gas was passed through the solution for about 10 minutes until a yellow color appeared. The polymer which was obtained weighed 10.39 grams and showed a nitrogen analysis of about 1.1% nitrogen indicating that there was present about 0.09 acetamido methylene group per styrene mer unit. The glass transition temperature ($T_g$) of the polymer was 113°C. A compression molded sample of the polymer had a critical strain in the same oil as in Example 10 of 0.23%. When a molded sample was burned, it did not drip as contrasted to the unamidized polystyrene which did drip when burned.

EXAMPLE 12

Employing the same conditions as in Example 10, 5.21 grams (0.05 mol) polystyrene and 2.23 grams (0.025 mol) N-methylolacetamide were dissolved in 160 ml. chloroform and 40 ml. nitromethane. $BF_3$ gas was passed through the solution for about 20 minutes until a yellow color appeared. The isolated polymer weighed 5.19 grams and contained about 2.3% nitrogen indicating that there was present about 0.2 acetamido methylene group per styrene mer unit. This polymer had a glass transition temperature of 125°C. Compression molded samples had a critical strain in the same oil used as in Example 10 of 0.44%. Again the compression molded sample did not drip when it burned as contrasted to the unamidized polystyrene which dripped when it was burned.

EXAMPLE 13

Employing the same conditions as in Example 10, 4.17 grams (0.04 mol) polystyrene and 1.78 grams (0.02 mol) N-methylolacetamide were dissolved in 45 ml. chloroform and 5 ml. nitromethane. $BF_3$ gas was passed through the solution until it was saturated which took about 10 minutes. The polymer thus obtained weighed about 5.27 grams and analysis showed the presence of 4.0% nitrogen indicating approximately 0.37 acetamido methylene group per styrene mer unit. As in the previous examples, the compression molded sample when burned did not drip but instead charred as contrasted to unamidized polystyrene which dripped when it burned. When a portion of the molded sample was soaked in toluene for 120 minutes, it did not dissolve or even noticeably swell as contrasted to unamidized polystyrene which dissolves within minutes in toluene. This clearly indicated the ability to increase the resistance of polystyrene to solvents such as toluene.

Thermogravimetric analyses of the amidized polystyrenes showed that they were more stable thermally than the unamidized polystyrene. The following table shows the weight loss after heating both unamidized and amidized polystyrene after 48 hours at 250°C.

TABLE

| *Amide Groups | Weight Loss After 48 Hours At 250°C |
|---|---|
| 0 | 80% |
| 0.14 | 45% |
| 0.20 | 25% |

*Average number of acetamidomethylene groups per styrene ring.

Instead of dissolving the aromatic carbocyclic polymer in a solvent in order to modify the bulk polymer with the amido alkylene groups, it is also possible to treat articles molded from aromatic carbocyclic polymers for the purpose of modifying the surface of such articles. For instance, one method involves contacting the surface of the molded article with the amidoalkylating agent of Formula II in the presence of a Friedel-Crafts catalyst and a solvent component which is a mixture of a good solvent for the polymer and a poor solvent for the polymer to introduce the amido-methylene groups of Formula I into the polymer at the surface of the molded part. Typical good solvents are those described above in my process for treatment of the aromatic polymer and solution. Typical poor solvents are, for instance, diethyl ether, saturated hydrocarbons such as hexane, methyl alcohol, etc. A suitable mixture of solvents is employed in proportions designed to yield a limited softening or solution of the polymer surface.

It will of course be apparent to those skilled in the art that in addition to the polymers described above, other polymers may be employed and modified, many examples of which have been given above. Furthermore, the amidoalkylating agent instead of being the methylol derivative can be the halogen derivative with the results being the same as that using the methylol derivative. Obviously, the molar ratios, the reaction conditions, solvents, etc. may be altered within the scope of the invention.

The products of the present invention can be used in various applications. The improved solvent resistance and improved burning characteristics of the amidized surfaces are advantageous as insulation for conductors and in various plastic structures subjected to weathering conditions, household cleaners, etc. For example, plastic housing components of room air conditioners may be treated for improved resistance to weathering and also to better meet the standards of flammability. Control knobs made from the various polymeric compositions when modified by means of the amidoalkylene groups show increased resistance to ultraviolet light and greatly improved resistance to attack by alkaline cleaning compounds.

What I claim as new and desire to secure by Letters Patent of the United States is:

1. An aromatic carbocyclic resinous polymer having chemically combined phenyl radicals to which are directly attached from 0.01 to 4

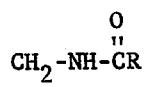

groups per phenylene radical where R is either methyl or $CH_2=CH-$.

2. An acetamidomethyl substituted polymer as in claim 1.

3. An acrylamidomethyl-substituted polymer as in claim 1.
4. An amidoalkyl modified polymer as in claim 1 containing from 0.01 to 1
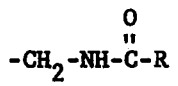
group per aromatic carbocyclic radical.
* * * * *